United States Patent Office 3,485,556
Patented Dec. 23, 1969

3,485,556
MULTIFOCAL PLASTIC OPHTHALMIC LENS
Andrius A. Naujokas, Webster, N.Y., assignor to Bausch & Lomb Incorporated, Rochester, N.Y., a corporation of New York
Filed Apr. 1, 1966, Ser. No. 539,488
Int. Cl. G02c 7/06
U.S. Cl. 351—169
2 Claims

ABSTRACT OF THE DISCLOSURE

Disclosed is a multi-focal synthetic plastic ophthalmic lens wherein there is provided a major lens portion of one index of refraction and a minor lens portion of a different index of refraction with a uniform index gradient therebetween. This application also discloses the method of making multifocal ophthalmic lenses of this type.

---

This invention relates to methods for polymerizing organic resins by diffusion of monomers across a liquid interface with subsequent polymerization, and to novel optical elements having variable refractive index. In particular, the present invention provides a multifocal ophthalmic lens having two or more refractive surfaces with homogeneous refraction properties and a diffused surface having a refractive index gradient.

Multifocal ophthalmic lenses have been employed in spectacles to enable the eyeglass wearer to accommodate for different focal distances. With age the eyes may lose their ability to change from near vision to distance vision and back due to hardening of the crystalline lens. In the past bifocal spectacles have been used having separate fields for near and distance vision. The near vision or reading portions of the ophthalmic lenses generally have additional power of about one to three diopters. In the early stages of presbyopia there is usually sufficient accommodation to permit the use of bifocal lenses for obtaining clear vision of objects located at any distance from the eye, and only rather small additional power is required for the reading segments of the glasses. However, with further loss of accommodation ability the required addition power for the near vision portions establishes a difference of about 1.5 to 2 diopters between bifocal portions. Experience has shown that intermediate powers must be provided to permit adequate binocular accommodation between the extremes of far distance vision and reading distance vision. Tri-focal lenses containing segments for different dioptric powers create an intermediate vision field between the near and far fields. While bifocal and trifocal ophthalmic lenses have been accepted for correction of the presbyopic eye, there exist certain disadvantages in the optical structure of most of these lenses.

The changes in power between the various portions of lens element can be accomplished by using materials having different refractive indexes or by generating different curvatures. However these methods of manufacture result in distinct lines between the segments having different indexes or different curvatures. These lines cause blurring and frequent discomfort to the wearer during the sweep of the eye from one portion of the lens to another.

Also, the distinct lines are found objectionable for aesthetic reasons and many persons consider these lens cosmetically unattractive because they indicate the wearer's age. Most of the prior art attempts to eliminate the sharp demarcation line have centered on the use of aspheric curvatures between bifocal portions of the lens to provide a transition area between different spheric surfaces. Such approaches, represented by U.S. Patents 2,405,989, 2,878,-721, and 2,869,422 have the disadvantage of requiring difficult grinding steps for glass lenses or molds for plastic lenses by replication processes. The costs have generally been prohibitive or the quality of the generated surfaces unsatisfactory.

Another approach to the multifocal lens problem has been in the use of materials having variable refractive index. Considerable efforts have been expended in the modification of glass compositions to effect a continuously-variable index change in the material used for ophthalmic lenses. There is known a segment-type lens in which the demarcation lines are eliminated by using a segment portion having a refractive index gradient in a blended glass. The gradient varies from a high index segment glass to match a low-index blank glass. Another approach to the variable-index multifocal lens is described by Rosenbauer in U.S. patent application S.N. 518,272, Jan. 3, 1966, now abandoned in favor of continuation-in-part application S.N. 757,220, filed Aug. 28, 1968 and assigned to the assignee of the present invention. This invention provides for exchange of low-index ions with high-index ions in the glass matrix of a preformed lens portion. This results in a matched index at the interface between solid glass segments. The principal advantages to using variable-composition optical materials to produce multifocal lenses is in the use of simple geometrically-uniform spheric surfaces.

It has been discovered that variable-index optical resin materials may be provided for manufacturing plastic optical elements. These plastic materials are produced by a novel process in which an interface is established between monomeric liquids. By diffusing the liquids in a controlled path and subsequently polymerizing the resin monomers, a non-homogeneous optical solid material is created having a transition zone of refractive index gradient from a higher-index first polymer to a lower-index second polymer through a co-polymeric portion having variable composition. The materials may be produced from a variety of compatible copolymer-forming liquid monomers, especially the allyl plastics favored for optical use due to their transparency, scratch resistance, and replication qualities.

New and useful optical elements, such as a multifocal ophthalmic lens, can be manufactured from these materials. In one embodiment of the invention a multifocal lens is produced by layering of diallyl phthalate and allyl diethylene glycol-2-carbonate liquid monomers in a lens mold, diffusing the monomers across the liquid interface to establish a composition gradient, and polymerizing the allyl monomers in situ to create a variable-composition copolymer zone having a corresponding index change. This ophthalmic lens has spheric surfaces and two vision areas for near and distance sight with an intermediate gradient area disposed horizontally below the normal vision plane for distance. Other optical elements may be fashioned by correlating a shaped interface and diffusion zone with subsequent grinding operations.

Accordingly, it is an object of the present invention to provide novel articles, materials and processes for optical use. A particular object is to provide a method for partially diffusing liquid monomers across an interface with subsequent polymerization to solidify the liquids, thereby producing a novel resin material having a refractive index gradient. Another object of this invention is the manufacture of optical devices, such as ophthalmic lenses, having index gradients for altering the optical properties of refractive bodies. These and other objects and features of the present invention will be seen in the following description and in the appended drawing; wherein:

Figure 1:
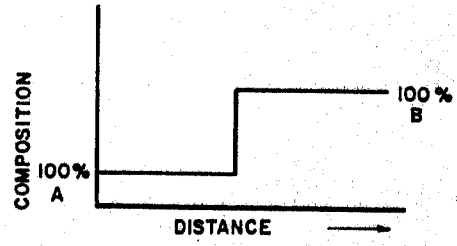
FIGURE 1 is a plot of monomer composition versus distance, showing a sharp interfacial break between liquid layers.
Figure 2:
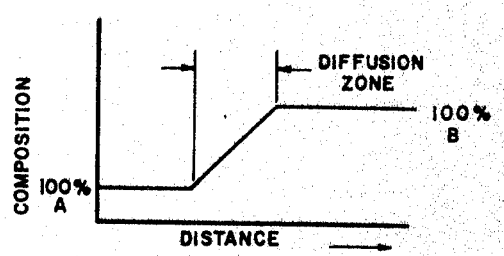
FIGURE 2 is a similar plot showing variations between mixed monomer composition in a diffusion zone.

Referring to the drawing, FIGURES 1 and 2 are representative of the mechanism for obtaining a composition gradient. In FIGURE 1 a liquid interface has just been created between two compatible monomers. The transition between pure allyl diethylene glycol carbonate (100% A) and pure diallyl phthalate (100% B) is a sharp break, indicating complete separation. Since the monomers are mutually soluble, the initial interface is replaced by a diffusion zone as in FIGURE 2. The width of the zone is determined by diffusion process conditions, such as time and temperature. The shape of the transition curve is determined by the transport rates for monomer A into B and vice versa. For simplicity a linear diffusion zone is shown.

Figure 3:
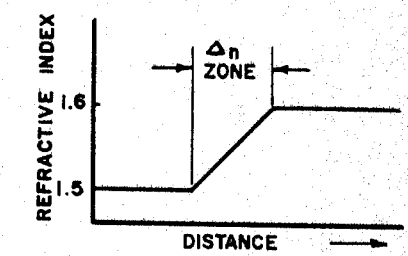
FIGURE 3 is a schematic plot showing changes in refractive index of a solid resin in a profile corresponding to FIGURES 1 and 2.

The effects of the diffusion process on refractive index is shown in FIGURE 3. A plot of the refractive index is related to the profile of the thermoset monomers in FIGURES 1 and 2. Pure allyl diethylene glycol-2-carbonate polymer has an index of about 1.5, while pure diallyl phthalate has an index of about 1.6. The zone of refractive index change is represented linearly.

The two allyl monomers described above were chosen for their optical qualities of transmission, hardness, replication properties, and differences between indexes. Greater power changes will be realized from the matching of proper plastic monomers having large refractive property changes between their respective solid resins.

In order to be useful for the novel process and materials the monomer compositions must be diffusible in at least one direction across an interface. The monomers must be chemically compatible and capable of forming copolymers with one another. The plastic optical elements must be transparent in a portion of the radiation spectrum. Another important property is the ability to polymerize the monomers after diffusion without significantly changing the composition gradients, at least the changes must be predictable or controllable.

Suitable resins for use in this invention include the acrylic polymers and copolymers. Methyl methacrylate ($n=1.48-1.50$ for the solid resin) may be paired with styrene ($n=1.59-1.60$ for polystyrene), or a mixed monomer of methyl methacrylate and styrene ($n=1.53-1.56$ for copolymer) may be paired with either or both. Another compatible acrylic monomer is alpha-methyl-styrene and methyl methacrylate comonomer ($n=1.52$ for copolymer). The pure monomers and mixed monomers may be cured after diffusion by catalysts and/or thermal reaction.

Styrene forms a transparent copolymer with acrylonitrile which can be utilized in this invention. Also, the small difference in index between the pure polymers of styrene and vinyl toluene may be of value, although the index gradient may be too small to be of practical value for ophthalmic lenses. For some optical elements a small index change may be quite valuable, and the predictability of diffusion properties for adjacent homologs may have particular significance. Various epoxy resins may be used to advantage.

The preferred compositions are the allyl monomers and mixtures, including allyl diglycol carbonates, allyl phthalates, allyl chloroacrylates. These may be used alone as monomeric constituents, or may be mixed with compatible monomers such as vinyl compounds.

The monomers, monomeric mixtures and compositions referred to herein are intended to be terms embracing liquids containing diluents and other inert constituents. For instance, diluent acetone may be added to allyl monomers up to about 10% without substantially changing the polymerization properties. Beneficial results may be imparted to the optical properties of index, dispersion, etc. by additions to the liquid monomers prior to curing. Lead octoate, or similar organo-metallic compounds, may be used for its index-changing properties in a resin matrix.

The method steps involved in production of plastic lens by the diffusion process include; (a) establishing an interface between two or more monomeric compositions which are diffusible, chemically compatible, and capable of forming copolymers of varying composition; (b) diffusing the monomeric compositions into one another or at least one into the other in a controlled manner; and polymerizing the diffused and intermingled monomeric compositions to form solid optical resins having variable composition and refractive index in the diffused zone adjacent the original interface.

Perhaps the most simple method for establishing a liquid interface is in the layering effects realized by filling a mold cavity sequentially with a denser monomer and forming a flat interface by pouring a second less-dense monomer over the dense liquid. The shape of the interface is determined by gravity. More viscous liquids are easier to control for some interface shapes. Where more complex interface contours such as cylinders are desired a thin separator may be used to contain different monomeric composition in adjacent sections of a horizontally disposed mold cavity. After pouring the monomers the flat or contoured separator may be removed carefully to form the liquid interface. Rather sophisticated index gradients may be produced by this method, and selective grinding in the diffused zone can be used to generate aspheric-type optical elements using simple plano and spheric grinding tools.

The diffusion step is best performed in a closely-controlled environment. A typical diffusion process utilizes isothermal conditions and a predetermined diffusion rate to predict the depth and degree of diffusion. Faster rates may be obtained by ultrasonic vibrations.

The polymerization of various monomers is within the skill of most chemists and the particular curing methods do not form a part of this invention. It should be noted that several monomers cured by thermosetting or catalysts are substantially disclosed. The allyl monomeric compositions are easily polymerized at relatively low temperatures using a small amount of catalyst.

Figure 4:
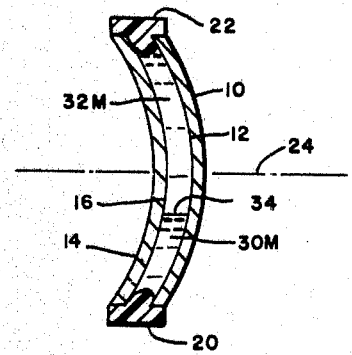
FIGURE 4 is a vertical cross-section view of a lens mold for casting plastic opthalmic lenses.

A typical mold assembly for ophthalmic lenses is shown in FIGURE 4. A lens having positive power is made by casting between two mold elements having different spheric replication surfaces. The front surface is formed by mold element 10 having a smooth spheric surface 12. The rear surface of the lens is formed by mold element 14 having a different smooth spheric surface 16. Mold elements 10 and 14 are separated and sealed by a soft flexible spacing gasket 20 having an orifice 22 for introducing liquid monomeric compositions into the mold cavity. The mold elements are aligned by the gasket to form a normal viewing axis comprising horizontal plane 24. A quantity of first monomer 30M is carefully deposited in the bottom of the mold cavity. Good control of the liquid may be exercised using a hypodermic syringe and needle projected through orifice 22. A second monomer 32M is carefully layered over the first and fills the mold, which is usually sealed to prevent leakage of air through orifice 22. By gravity a flat liquid interface 34 is formed and the monomers are diffused and solidified.

Figure 5:
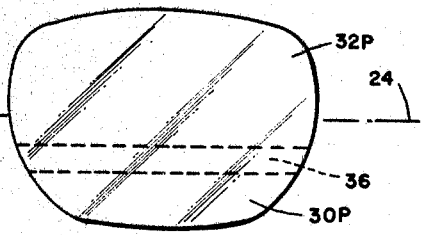
FIGURE 5 is a vertical elevation of a plastic lens element having multifocal portions and a continuously-variable refractive index portion intermediate.

FIGURE 5 shows the finished multifocal ophthalmic lens after the circular lens blank cast in the mold assembly has been edged to the desired shape. There is a first homogeneous refractive surface 30P for near vision and a second homogeneous refractive surface 32P for distance vision. An intermediate zone 36 of copolymer material has a refractive index gradient continuously changing from the lower index of polymer 32P toward the higher index of polymer 30P. Normally the diffused zone is disposed horizontally and slightly below normal viewing plane 24.

EXAMPLE

An ophthalmic lens is made using the mold assembly of FIGURE 4 and allyl monomers. A first monomer consisting essentially of diallyl phthalate with 4 wt. percent isopropryl percarbonate catalyst is layered with a second monomer consisting essentially of allyl diethylene glycol-2-carbonate containing 4 wt. percent of the same isopropyl percarbonate catalyst. These are layered by gravity to establish an interface plane between the liquid monomers.

Figure 6:
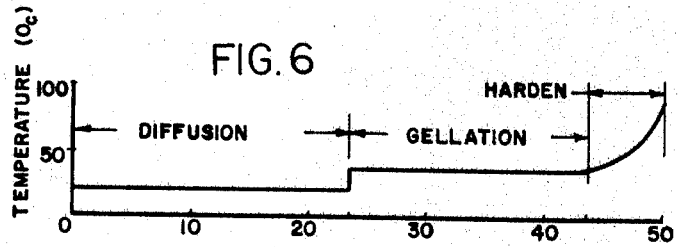
FIGURE 6 is a time and temperature diaphragm of a typical process cycle for diffusing allyl monomers and thermosetting the diffused material according to a predetermined program.

The diffusion process is isothermally conducted at about 25° C. for about 24 hours under static conditions. The mold assembly containing the diffused monomers is heated uniformly to partially polymerize or gell the monomers at about 35° C. to about 40° C. for about 20 hours, as shown in FIGURE 6. The final stages of polymerization in which the pure polymers and co-polymers are hardened is effected by an increasing temperature program over about 6 hours to a maximum temperature of 90° C. to 100° C. The mold assembly is separated from the lens, and after edging the multifocal lens of FIGURE 5 is produced.

What is claimed is:

1. A multifocal ophthalmic lens having an upper portion of homogeneous transparent optical resin having a refractive index of about 1.5, a lower portion of a different homogeneous transparent optical resin having a refractive index of about 1.6, and a horizontal intermediate portion of transparent copolymer resin constituting a mixture of said two optical resins and having a refractive index which gradually varies from the high refractive index to the low refractive index whereby a substantially continuous change in lens power from the upper portion of the lens to the lower portion of the lens is achieved.

2. The lens of claim 1 wherein the upper lens portion consists essentially of poly(allyl diglycol carbonate), and said lower portion consists essentially of poly(diallyl phthalate).

References Cited

UNITED STATES PATENTS

| | | | |
|---|---|---|---|
| 1,509,636 | 9/1924 | Bugbee | 351—169 |
| 2,331,716 | 10/1943 | Nadeau et al. | |
| 2,547,416 | 4/1951 | Skellett. | |
| 2,964,501 | 12/1960 | Sarofeen | 350—178 X |

DAVID H. RUBIN, Primary Examiner

U.S. Cl. X.R.

350—175; 351—177